(12) United States Patent
Kallio

(10) Patent No.: US 7,428,041 B2
(45) Date of Patent: Sep. 23, 2008

(54) LIDAR

(75) Inventor: Jukka Kallio, Helsinki (FI)

(73) Assignee: Viasala OYJ, Helsinki (FI)

( * ) Notice: Subject to any disclaimer, the term of this patent is extended or adjusted under 35 U.S.C. 154(b) by 390 days.

(21) Appl. No.: 10/505,741

(22) PCT Filed: Feb. 27, 2003

(86) PCT No.: PCT/FI03/00143

§ 371 (c)(1),
(2), (4) Date: Apr. 11, 2005

(87) PCT Pub. No.: WO03/073123

PCT Pub. Date: Sep. 4, 2003

(65) Prior Publication Data

US 2005/0179888 A1  Aug. 18, 2005

(30) Foreign Application Priority Data

Feb. 28, 2002 (FI) .................................. 20020394

(51) Int. Cl.
*G01C 3/08* (2006.01)
*G01N 21/00* (2006.01)

(52) U.S. Cl. .................. 356/4.01; 356/337; 356/342

(58) Field of Classification Search ................ 356/4.01, 356/5.01, 5.1, 337, 342
See application file for complete search history.

(56) References Cited

U.S. PATENT DOCUMENTS

| 4,040,739 A | * | 8/1977 | Witte ..................... 356/4.05 |
| 4,165,936 A | | 8/1979 | Eisenring et al. |
| 5,262,646 A | * | 11/1993 | Booker et al. ............. 250/341.4 |
| 6,411,371 B1 | * | 6/2002 | Hinderling et al. ......... 356/4.01 |
| 2002/0183626 A1 | * | 12/2002 | Nordstrom et al. .......... 600/476 |

FOREIGN PATENT DOCUMENTS

| DE | 199 07 546 A1 | 10/1999 |
| WO | WO-00/16122 A1 | 3/2000 |

* cited by examiner

*Primary Examiner*—Isam Alsomiri
(74) *Attorney, Agent, or Firm*—Birch, Stewart, Kolasch & Birch, LLP

(57) ABSTRACT

A lidar, which includes a transmitter and a receiver, as well as an optical system, which is arranged to direct at least part of the light sent by the transmitter as a transmitter beam progressing towards an object and to define the receiver beam to the receiver, at least part of the light arriving from the zone of which is focussed on the receiver. The optical system of the lidar is implemented in such a way that the beams immediately in front of the lidar are located essentially outside of each and one of the beams at least partially surrounds the other beam. The optical system includes an integrated optical, which has a first area for forming the transmitter beam, and a second area for forming the receiver beam.

15 Claims, 8 Drawing Sheets

LIDAR

CROSS-REFERENCE TO RELATED APPLICATION

The present application claims priority under 35 U.S.C. §119 to PCT Patent Application No. PCT/FI03/00143, filed Feb. 28, 2003, and Finnish Patent Application No. 20020394, filed Feb. 28, 2002, the entire contents of which are hereby incorporated by reference.

BACKGROUND OF THE INVENTION

1. Field of the Invention

The present invention relates to a lidar.

2. Description of Background Art

A lidar of this kind is used to perform measurements, in such a way that a transmitter beam is sent towards the object to be measured and the returning signal coming back from the direction of the object being measured is observed. The return signal is formed when the light of the transmitter beam is scattered and/or reflected by the object being measured.

The lidars to which the present invention relates are particularly used for making meteorological measurements. The commonest measurements performed with the aid of the lidar are cloud ceiling measurements, visibility measurements, and determining the structure and height of atmospheric boundary layers.

FIG. 1 shows the optical construction of one lidar according to the prior art.

FIG. 2 shows the optical construction of a second lidar according to the prior art.

The lidar of FIG. 1 includes a transmitter 1, typically a pulsed laser device, which produces the light to be transmitted, and a receiver 2, by means of which light can be received at the transmitted wavelength. The lidar also includes a lens 13, which aligns the light transmitted by the transmitter 1 to form an essentially parallel transmitter beam 14. The figure also shows particles 15 in the atmosphere, from which the transmitter beam 14 is scattered and/or reflected. Part of the scattered and/or reflected light 16 proceeds to the lens 13, which focuses the light on its focal point. In addition to the object, the light is also scattered by the surfaces, particles, and air molecules inside the lidar and in its vicinity. In terms of the measurement of the object, this extremely powerful signal component is a disturbance, which can be called crosstalk. The light scattered from the atmosphere at a close measurement distance from the lidar is, like the crosstalk significantly stronger that the signal received from a great distance, because scattered light attenuates in proportion to the square of the distance. In addition, multi-scattered light arrives at the receiver 2, both from the object and from the atmosphere between the lidar and the object. Here, the term multi-scattered light refers to re-scattered light, i.e. light that has been scattered through more than one particle.

In the lidar of FIG. 1, the receiver 2 cannot be located at the focal point of the lens 13, because the transmitter 1 is at the focal point of the lens. The lidar is therefore equipped with a beam splitter 17, which reflects the light coming from the lens 13 to the receiver 2. Thus, a reflected focal point is created for the receiver 2, the lens 13 focussing onto it the light arriving at the lens 13 from the direction of the central axis of the lens. Thus, a field of vision, which corresponds with a good degree of accuracy to the shape of the transmitter beam 14, is created for the receiver 2. The field of vision of the receiver is also called the receiver beam. In the solution shown in FIG. 1, the central axes of the transmitter beam 14 and of the field of vision lie on the same line, allowing it to be termed coaxial lidar.

In the coaxial solution according to FIG. 1, a problem arises in the form of crosstalk and excessive scattering in the near zone of the lidar, or at close measurement distances. Excessive near-zone scattering can upset measurement in the lidar's entire measurement range, because the receiver 2 can then become saturated by the excessively strong backward signal.

Here, the term near zone refers to the area extending from inside the lidar to the start of the desired measurement range (e.g., 0.1 m). The measurement range, on the other hand, is the distance that starts from the near zone and terminates at the maximum measurement range. In this case, the measurement range is divided into near measurement distances and the rest of the measurement range.

Lidar solutions are also known, in which the effect of near-zone scattering is less, because the transmitter beam and the field of vision of the receiver are located separately from each other. Such a solution can be termed biaxial lidar. In biaxial lidar, a one time scattered signal component is not received from the near zone; instead the signal received from the near zone is mainly multi-scattered light. Biaxial lidar is implemented by using two separate optical systems, one of which forms the transmitter beam and the other focuses the returning light on the receiver. In such a solution, there is considerably less scattering of the light into the receiver, when compared to the solution of FIG. 1. However, the solution is more complex and expensive, as it requires separate optical systems, typically lenses and systems of lenses, for both the receiver and the transmitter. Because the optical systems of the receiver and transmitter are separate from each other, the internal focussing of the apparatus is also difficult. If the central axis of the transmitter beam is not aligned with the central axis of the receiver beam, the transmitter beam can diverge from the receiver beam, in which case the signal returning from the near measurement distances will mainly comprise multi-scattered light, making the measurement more uncertain. The focussing error can also change during operation, due to mutual movement between the optical systems or vibration, so that measurement becomes unstable. In addition, in principle an error can arise from the fact that the scattering or reflection of the object and the medium do not behave symmetrically in relation to the transmitter beam. All in all, biaxial lidar is less stable than coaxial lidar of corresponding quality.

In addition, a lidar solution is known that utilizes a Cassegrain telescope, and in which the outgoing beam is reflected by means of a mirror located above the Cassegrain telescope. FIG. 2 shows a schematic diagram of such a solution. The lidar shown in FIG. 2 includes, like the lidar of FIG. 1, both a transmitter 1 and a receiver 2. Light is received by means of the Cassegrain telescope, which includes mirrors 23 and 24 that collect the light arriving from the area of the field of vision and focus it through a hole in the mirror 23 to the receiver 2. The lidar also includes a mirror 25, which is located above the mirror 24, in such a way that the outgoing light can be reflected to form a transmitter beam, which is located at least in the near zone of the lidar, in the centre of the field of vision of the receiver. In a solution like that of FIG. 2, some of the advantages of a biaxial solution and the coaxial solution depicted by FIG. 1 can be combined. This is because, in the solution of FIG. 2, the transmitter beam and the field of vision of the receiver do not overlap so much in the near zone of the lidar. In addition, the small alignment error of the transmitter beam and the field of vision of the receiver is compensated at least partially by the fact that the field of vision of the receiver is located around the transmitter beam. A drawback with the Cassegrain solution is its complexity. To operate satisfactorily, the Cassegrain solution also requires the mutual alignment of several optical components. In the solution of FIG. 2, the following precise alignments at least must be made:

- centering and orientation of the mirrors 23 and 24 of the telescope
- centering of the receiver 2
- focussing of the receiver (generally carried out by adjusting the distance between the mirrors 23 and 24)
- focussing of the transmitter 1
- parallel alignment (with the aid of the mirror 25) of the transmitter beam and the receiver beam (field of vision of the receiver).

This means that making the solution according to FIG. 2 ready to operate is quite demanding. Perhaps the most demanding of the aforementioned alignment stages is making the transmitter beam and the receiver beam parallel to each other. The parallel alignment of the beams can be particularly difficult, if it must be carried out in field conditions after the lidar has been moved.

Thus, each of the known solutions referred to above has its own drawbacks, which reduce its attractiveness and usefulness. A coaxial solution like that shown in FIG. 1 has the problem of excessive near-zone scattering. A biaxial solution has, in turn, the problem of aligning the transmitter beam and the receiver beam and the very great influence of an alignment error on the strength of the received signal. In the solution according to FIG. 2, though an alignment error between the transmitter beam and the receiver beam has less effect than in the biaxial solution, the actual alignment is even more difficult that in the biaxial solution. In other ways too, the device shown in FIG. 2 is complex and demands more alignment operations that the other solutions.

SUMMARY AND OBJECTS OF THE INVENTION

Object of the invention is to create an improved optical structure for lidar, in which it would be possible to combine more than previously of the beneficial aspects of the aforementioned prior art, while simultaneously avoiding at least some of the problems associated with the prior art. An object of the invention is particularly to create an optical structure, which, in terms of its structural properties would permit

- greater stability compared to the known biaxial structure,
- less near-zone scattering than the known coaxial lidar (the solution of FIG. 1), and
- nevertheless be easier to align than the known Cassegrain solution (FIG. 2).

The invention is based on refracting the transmitter beam and the receiver beam within a single optical system, principally with the aid of a single integrated optical component. The edge area of the integrated optical component is used to refract one of the beams while the central area of the integrated optical component is used to refract the other beam. In this case, the term refracting refers to focussing on a common focal point light rays proceeding parallel to each other, or focussing light rays diverging from a common focal point to form light rays that proceed in parallel. The refraction can thus be carried out with the aid of, for example, a lens or a curved mirror. The term integrated optical component, in turn, refers to an optical component, which participates in refracting both the transmitter beam and the receiver beam, and which can be mechanically handled as a single piece. The integrated optical component can be formed of a single optical element, such as a lens or a mirror. Thus, a single lens can act as the integrated optical component referred to here. Alternatively, the integrated optical component can be formed of more than one optical element, by connecting them together in such a way that they operate mechanically as a single piece. Besides the integrated optical component, at least one reflection is designed for the optical system, so that the focal point of the light refracted in the edge area of the integrated optical component lies at a distance to the focal point of the light refracted in the centre area of the integrated optical component. Thus, the transmitter beam and the receiver beam are formed to lie inside each other, so that, in the near zone of the lidar, the field of vision of the receiver surrounds the transmitter beam, or the transmitter beam surrounds the field of vision of the receiver. However, the solution, in which the field of vision of the receiver lies around the transmitter beam, is regarded as the better of these two alternatives.

Considerable advantages are gained with the aid of the invention.

This is because a solution according to the invention can be implemented in such a way that:

- The transmitter beam and the receiver beam surround, but do not, at least to any great extent, intersect each other in the near zone, so that the strength of the signal coming from the near zone is clearly less (multi-scattering in the air always creates a certain signal component) than in the known coaxial solution.
- The transmitter beam and the receiver beam surround, but do not intersect each other in the near zone, so that, unlike the known biaxial solution, the structure permits a clearly more stable received signal with a specific precision of adjustment.
- The principal refraction of the transmitter beam and the receiver beam is carried out using an integrated optical component, which operates mechanically as a single piece, so that the lidar has a relatively simple construction and is clearly easier to align than in the known Cassegrain solution.

In the solution according to the invention, the alignment of the light can thus take place with the aid of a single optical system while nevertheless be arranged so that the field of vision of the receiver and the transmitter beam do not coincide in the near zone of the lidar. This permits greater stability than with the known biaxial structure, and simultaneously less near-zone scattering than in the known coaxial lidar.

The invention has also several embodiments, by means of which significant additional advantages are obtained.

In one embodiment of the invention, the transmitter beam and the field of vision of the receiver are located in the optical system at a distance to each other, in such a way that a so-called 'dark' zone remains in the near zone of the lidar, between the transmitter beam and the field of vision of the receiver. The 'dark' zone is thus located annularly around the transmitter beam while the field of vision of the receiver is located around the 'dark' zone. In the embodiment in which the transmitter beam surrounds the field of vision, the 'dark' zone is located correspondingly around the receiver beam. The 'dark' zone is thus a zone, which the transmitter beam does not strike and which also is not included in the field of vision of the receiver. The implementation of the 'dark' zone between the field of vision and the transmitter beam further significantly reduces the scattering from the transmitter beam to the receiver, in the near zone of the lidar. As the distance increases, the transmitter beam and the field of vision diverge, i.e. expand, so that despite the 'dark' zone, the field of vision and the transmitter beam begin to partly overlap each other within the measurement zone of the lidar.

A second embodiment of the invention has the additional advantage that the lidar can be made more efficient than the known solution shown in FIG. 1, as, in the preferred embodiment of the invention, the loss caused by the semi-translucent mirror is saved. In turn, the improvement in efficiency permits the receiving surface area and thus the entire optical system to be given smaller dimensions. At the same time, the focal length can be reduced, which also helps to make the apparatus smaller.

In a third embodiment of the invention, the shapes of the transmitter beam and the field of vision are essentially rotationally symmetrical around their common central axis. This achieves the additional advantage that the symmetry of the system at least partly compensates for the object's possibly asymmetrical reflecting or scattering behaviour.

In the following, the invention is examined with the aid of examples and with reference to the accompanying drawings.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
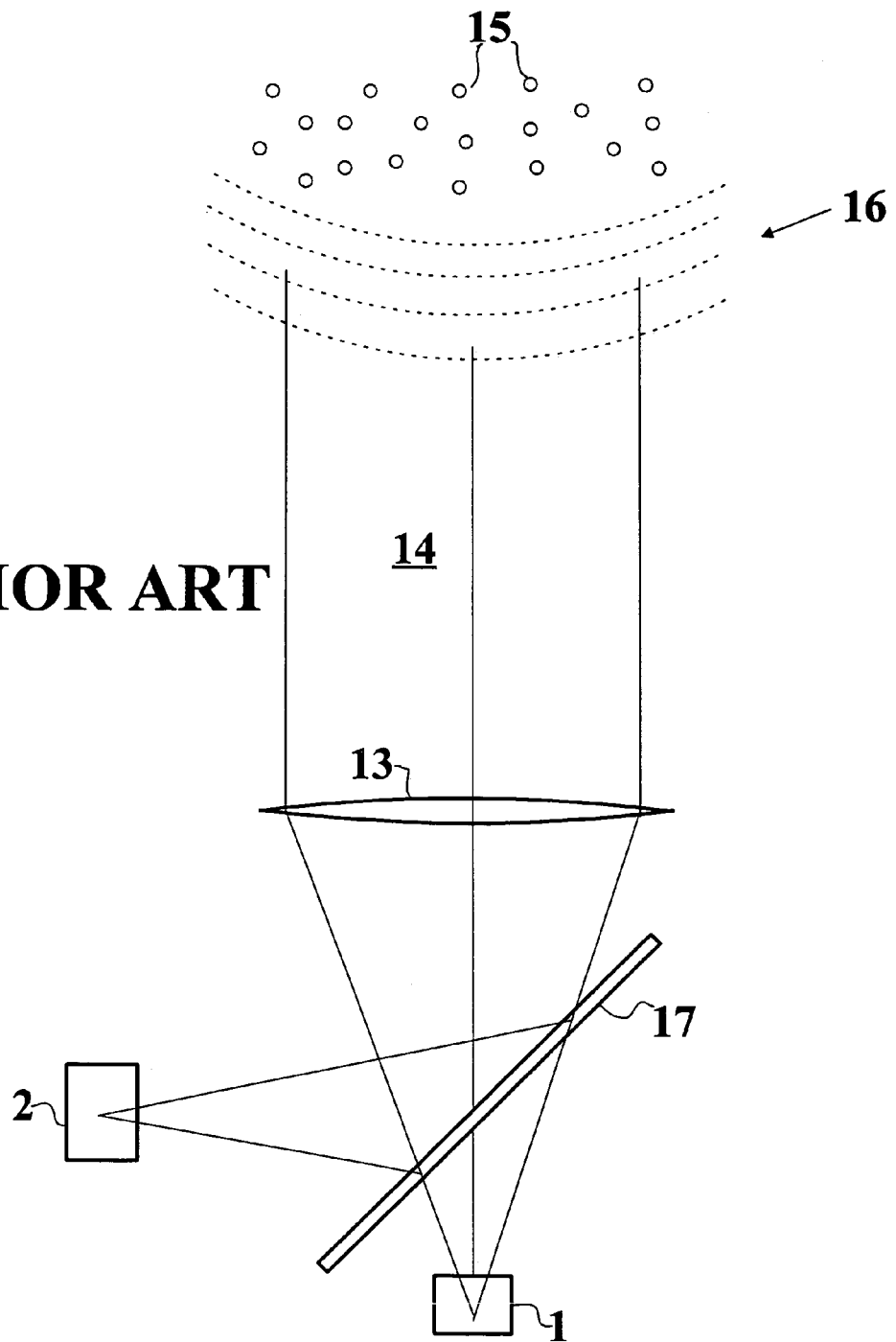
FIG. 1 shows the optical construction of one lidar according to the prior art.
Figure 2:
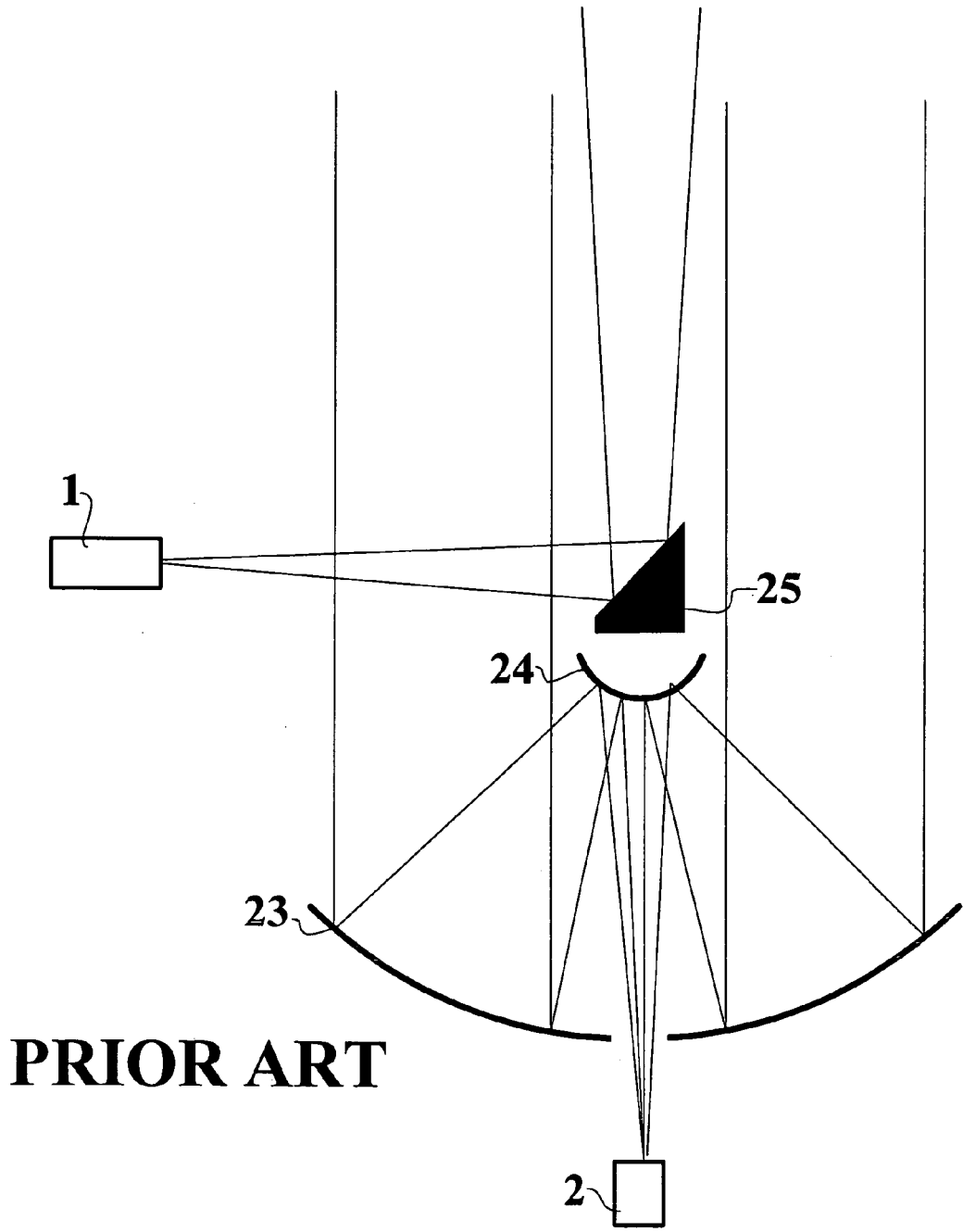
FIG. 2 shows the optical construction of a second lidar according to the prior art.
Figure 3:
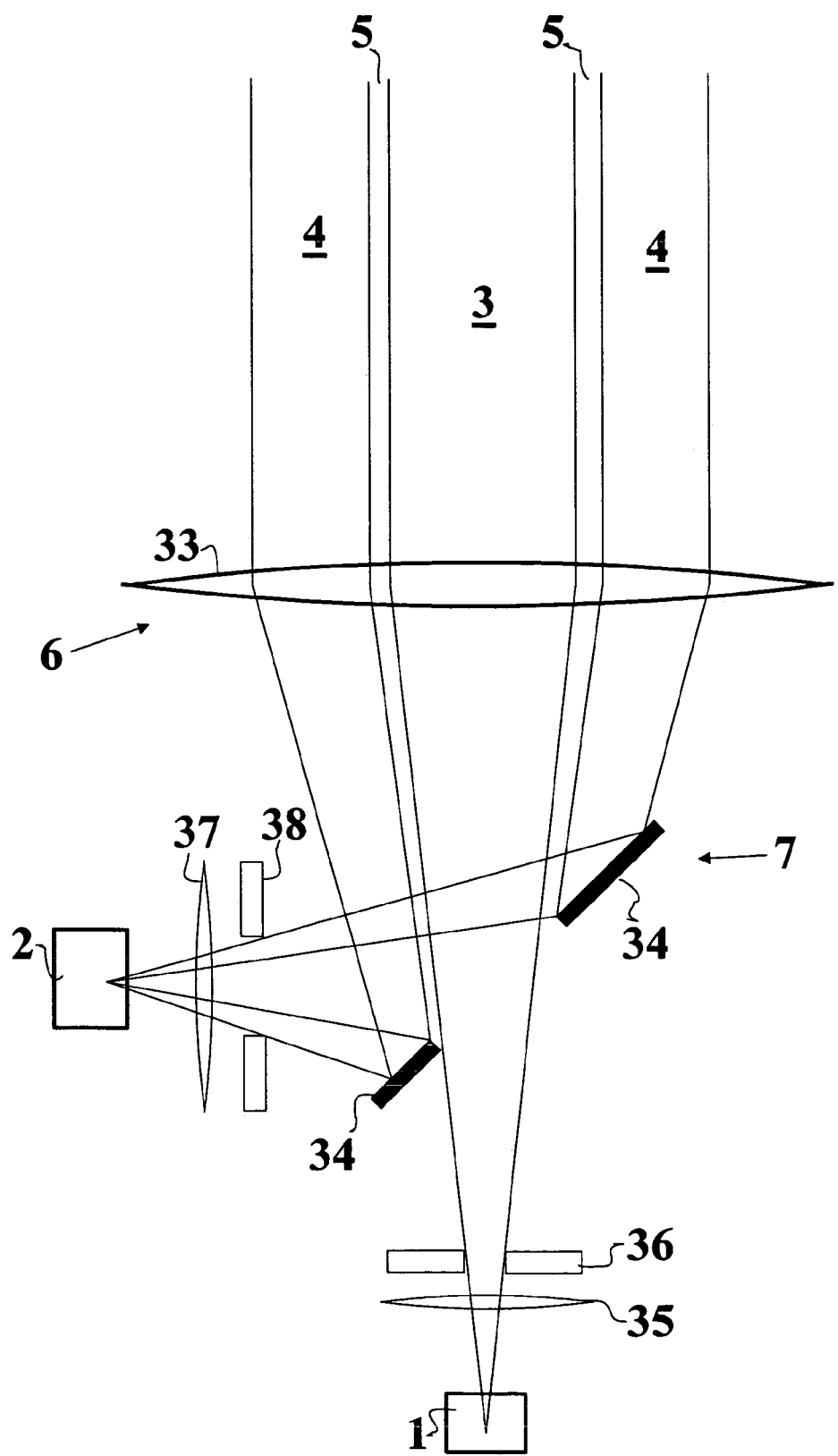
FIG. 3 shows a schematic diagram of one solution according to the invention.

The solution of FIG. 3 includes an integrated optical component 6 and a reflecting element 7, with the aid of which a transmitter beam 3 and a receiver beam 4 are formed. The integrated optical component 6 consists of, in this solution, a single lens 33. A mirror 34, in the centre of which a hole has been made, acts in turn as the reflecting element 7. The mirror 34 is positioned in such a way that the light obtained from the transmitter 1, which is located at the focal point of the lens 33, is directed through the hole in the mirror 34 to the central area of the lens 33, where it is refracted to form a transmitter beam of the desired shape. The mirror 34, however, is positioned so that the light arriving from the area of the desired receiver beam to the edge area of the lens 33 is refracted and reflected towards the reflected focal point. The receiver 2 is located at this reflected focal point.

In the basic solution of the embodiment of FIG. 3, there are thus four optical components to be positioned in relation to each other, i.e. the integrated optical component formed by the lens 33, and the transmitter 1, the receiver 2, and the mirror 34. Of these components, the lens 33 and the mirror 34 perform the principal refraction of the light and its division between two focal points. The other components shown in the figure are optional accessories, which, in some embodiments, can be used, for example, for dimensioning purposes, or to alter the shape of the beam of the receiver 2 or the transmitter 1 to conform to the optical properties of the lidar. These optional accessories are the pre-optics of the transmitter 1 and the pre-optics of the receiver 2. The pre-optics of the transmitter 1 can include one or more lenses 35 and/or a beam restrictor 36. The lens or lenses 35 are used, if necessary, to focus or shape the beam of the transmitter 1. The beam restrictor 36, which can be, for example, a plate with a hole, is used in turn if necessary to restrict the beam of the transmitter 1 to form a suitable shape. Correspondingly, the pre-optics of the receiver 2 can include one or more lenses 37 and/or a beam restrictor 38. The pre-optics are thus intended to adapt the receiver 2 or the transmitter 1 to the actual optical structure 6, 7 of the lidar. Refraction that may occur in the pre-optics is not therefore regarded as part of the refraction taking place in the optical structure 6, 7 of the lidar.

In the solution of FIG. 3, the receiver beam 4 has an annular shape and surrounds the transmitter beam 3. In addition, a 'dark' zone 5 is designed between the beams, to reduce the reception signal caused by reflection and simple scattering in the near zone. Thus, the signal received from the near zone is mainly caused by multi-scattering.

Figure 4:
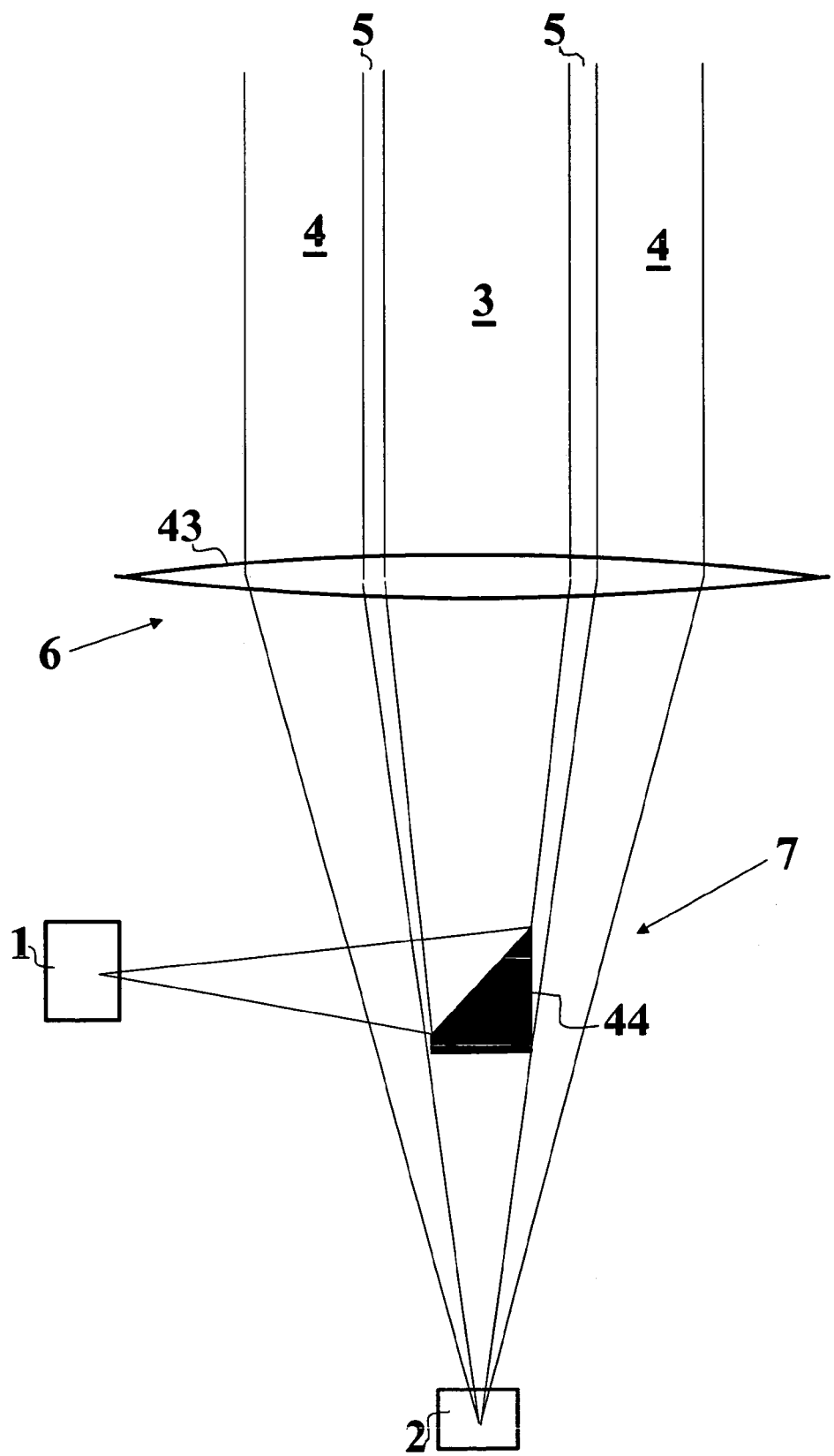
FIG. 4 shows a schematic diagram of a second solution according to the invention.

The solution of FIG. 4 includes an integrated optical component 6 and a reflecting element 7, with the aid of which a transmitter beam 3 and a receiver beam 4 are formed. In this solution, the integrated optical component 6 consists of a single lens 43. A mirror 44, which is aligned more or less with the central area of the lens 43, acts as the reflecting element 7. The mirror 44 is positioned in relation to the transmitter 1 in such a way that the mirror 44 reflects the focal point of the central area of the lens 43 to the transmitter 1. Thus, the light obtained from the transmitter 1 can be reflected through the mirror 44 to the lens 43 and refracted in the central area of the lens 43 to form a transmitter beam 3 of the desired shape. The mirror 44, however, is positioned so that it does not obscure the desired field of vision of the receiver 2, but preferably even restricts the receiver beam to the desired shape, by obscuring the central area in front of the receiver 2. The receiver 2 is thus located at the focal point formed from the edge area of the lens 43.

In the basic solution of the embodiment of FIG. 4, there are four optical components positioned in relation to each other in the same way as in the solution of FIG. 3, i.e. the integrated optical component formed by the lens 43, and the transmitter 1, the receiver 2, and the mirror 44.

In the solution of FIG. 4, optional accessories can be used in the same way as in the solution of FIG. 3. Possible accessories include the pre-optics of the transmitter 1 or the receiver 2, which can include one or more lenses and/or a beam restrictor. As in the solution of FIG. 3, a 'dark' zone is designed in the solution of FIG. 4, between the receiver beam 4 and the transmitter beam 3.

Figure 5:
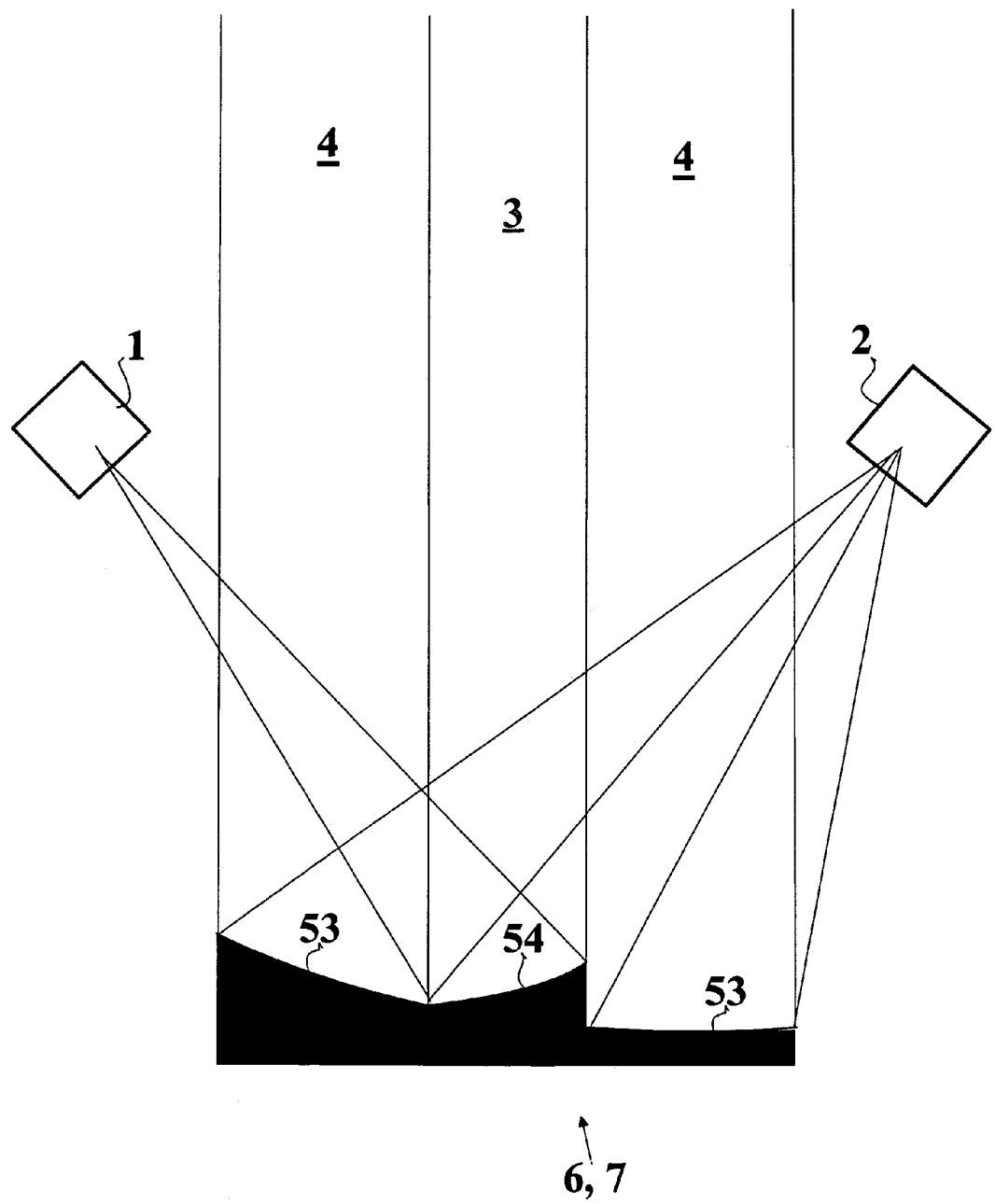
FIG. 5 shows a schematic diagram of a third solution according to the invention.

The solution of FIG. 5 includes an integrated optical component 6 and a reflecting element 7, with the aid of which a transmitter beam 3 and a receiver beam 4 are formed. In this embodiment, even the reflecting element 7 is integrated to form a single mechanical unit with the integrated optical component 6. In this solution, the integrated optical component 6 is formed of two curved mirrors 53 and 54 joined together. The outer curved mirror 53 reflects to a focal point outside the beams 3 and 4, where the receiver 2 is located and to which the receiver beam 4 is focussed from the surface of the outer curved mirror 53. The inner curved mirror 54 also reflects to a focal point outside the beams 3 and 4, but the inner curved mirror 54 is rotated in relation to the outer curved mirror 53 in such a way that the focal points reflected by the mirrors 53 and 54 lie at a suitable distance to each other. The transmitter 1 is located at the focal point reflected by the inner curved mirror 54, so that the light obtained from the transmitter is refracted in the central area of the curved mirror 54 into a transmitter beam 3 of the desired shape.

In the embodiment of FIG. 5, a particularly interesting feature is that it does not require a separate reflecting element 7, as both of the refracting members 53 and 54 contained in the integrated optical component 6 are themselves reflecting. Thus, the reflecting element 7 too is integrated as a single mechanical piece with the integrated optical component 6. This has the significant effect, in a lidar according to such an embodiment, of also not requiring the separate focussing of the reflecting element 7 and the integrated optical component 6, which are instead focussed at the same time and are always mutually correctly positioned. Thus, in the basic solution of the embodiment of FIG. 5, only three optical components must be positioned relative to each other, i.e. the integrated optical component (which also acts as the reflecting element 7) formed of the mirrors 53 and 54, the transmitter 1, and the receiver 2.

In the solution of FIG. 5, optional accessories can be used, as in the solution of FIG. 3. Possible accessories include the pre-optics of the transmitter 1 or the receiver 2, which can include one or more lenses and/or a beam restrictor. As in the solution of FIG. 3, a 'dark' zone 5 can be designed between the receiver beam 4 and the transmitter beam 3 in the solution of FIG. 5, even though such a zone is not shown in FIG. 5. The 'dark' zone can be implemented, for example, by restricting the beam sent from the transmitter 1, or by making a non-reflecting area on the surface of the curved mirror 53 or 54 close to the boundary line between the mirrors.

Figure 6:
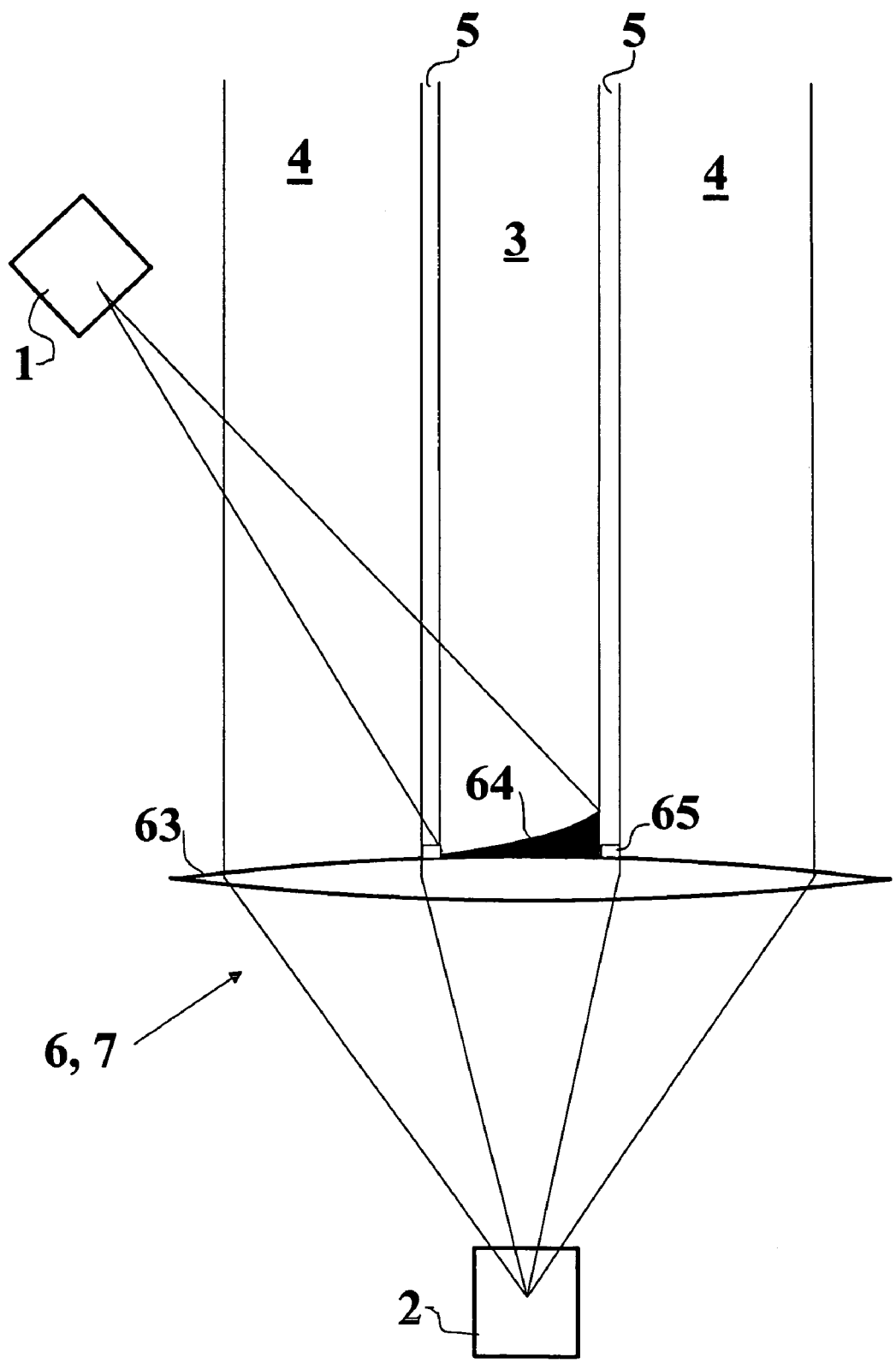
FIG. 6 shows a schematic diagram of a fourth solution according to the invention.

The solution of FIG. 6 includes an integrated optical component 6 and a reflecting element 7, with the aid of which a transmitter beam 3 and a receiver beam 4 are formed. As in the embodiment of FIG. 5, even the reflecting element 7 is integrated as a single mechanical piece with the integrated optical component 6. In this solution, the integrated optical component 6 consists of a lens 63 and a curved mirror 64, which is attached to the surface of the lens 63. The lens 63 has a focal point, to which the receiver beam 4 is focussed from the edge area of the lens 63. The receiver 2 is located at this focal point. The curved mirror 64 in turn reflects the focal point outside of the beams 3 and 4. The transmitter 1 is located at the focal point reflected by the curved mirror 64, in such a way that the light obtained from the transmitter 1 is reflected from the surface of the curved mirror 64, to form a transmitter beam 3 of the desired shape.

A particularly interesting feature of the embodiment of FIG. 6 is that it does not require a separate reflecting element 7, as the curved mirror 64 included in the integrated optical component 6 is itself reflecting. Thus, the reflecting element 7 too is integrated as a single mechanical piece with the integrated optical component 6. This has the significant effect that the lidar according to such an embodiment also does not require the reflecting element 7 and the integrated optical component 6 to be focussed separately, instead they are focussed at the same time and are always mutually in the correct position. Thus, in the basic solution of FIG. 6, only three optical components need be positioned relative to each other, i.e. the integrated optical component (which also acts as the reflecting element 7) formed by the lens 63 and the mirror 64, the transmitter 1, and the receiver 2.

In the solution of FIG. 6, as in the solution of FIG. 3, optional accessories can be used. Possible accessories include the pre-optics of the transmitter 1 or the receiver 2, which can include one or more lenses and/or a beam restrictor. As in the solution of FIG. 3, a 'dark' zone 5 can be designed between the receiver beam 4 and the transmitter beam 3. In the embodiment of FIG. 6, the 'dark' zone is implemented by placing a black-out ring 65 around the curved mirror 64, but the 'dark' zone can certainly also be implemented by restricting the transmitter beam with a restrictor placed in front of the transmitter 1, or by restricting the receiver beam 4 with a restrictor placed in front of the receiver 2.

Figure 7:
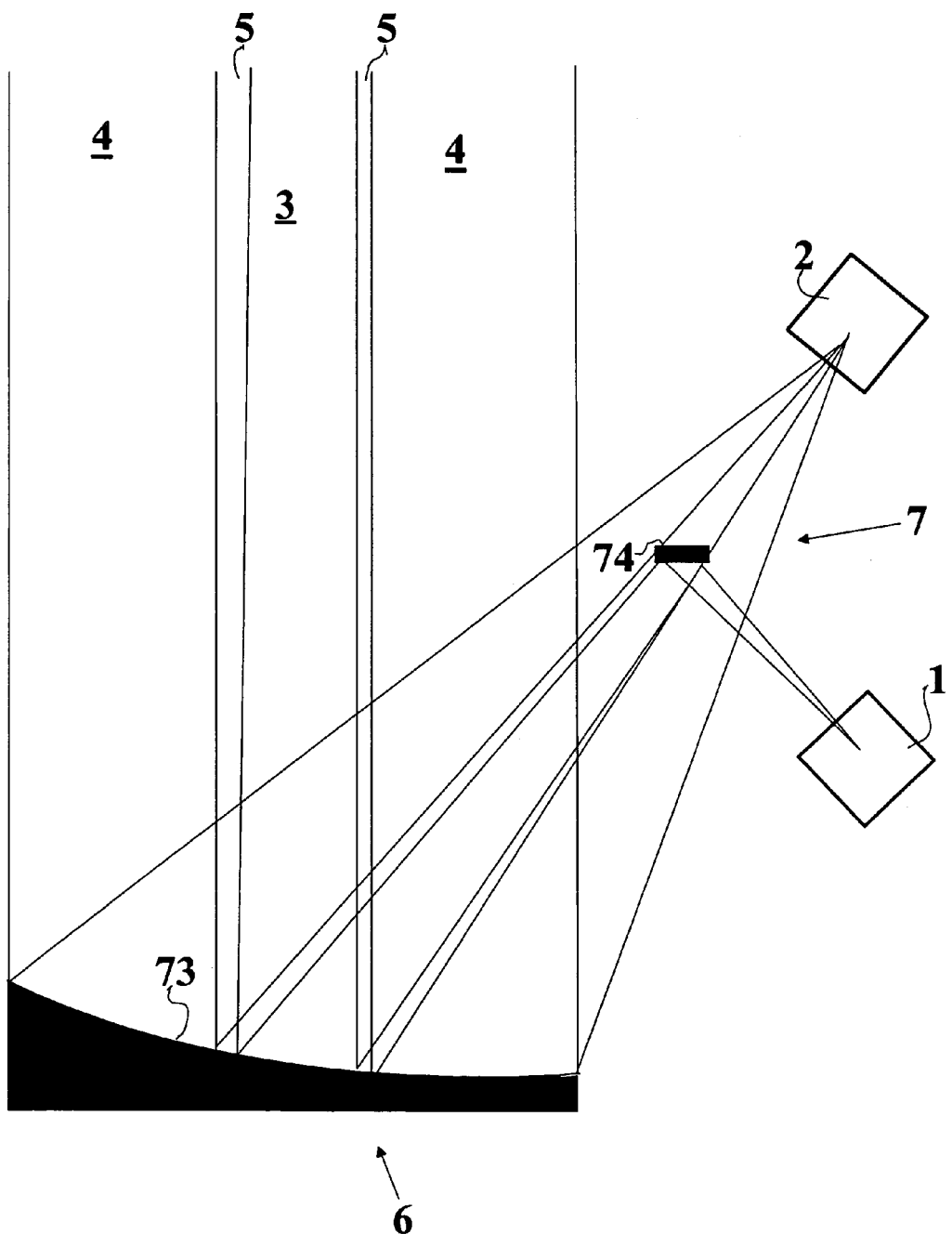
FIG. 7 shows a schematic diagram of a fifth solution according to the invention.

The solution of FIG. 7 includes an integrated optical component 6 and a reflecting element 7, with the aid of which a transmitter beam 3 and a receiver beam 4 are formed. In this solution, the integrated optical component 6 consists of a single curved mirror 73 with a focal point outside of the parallel beams (the transmitter beam 3 and the receiver beam 4). A mirror 74, which is located more or less in the centre of the beam proceeding towards the focal point, acts in turn as the reflecting element 7. The mirror 74 is positioned relative to the transmitter 1 in such a way that the mirror 74 reflects to the transmitter 1 the focal point formed in the central area of the curved mirror 73. Thus, the light obtained from the transmitter 1 can be reflected and refracted with the aid of the mirrors 73 and 74 into a transmitter beam 3 of the desired shape. On the other hand, the mirror 74 is positioned so that it does not obscure the field of vision desired for the receiver 2, but preferably even restricts the receiver beam to the desired shape by covering the central area in front of the receiver 2. Thus, the receiver 2 is located at the focal point formed by the edge area of the curved mirror 73.

In the basic solution of the embodiment of FIG. 7, as in the solution of FIG. 3, there are four optical components that have to be positioned in relation to each other, i.e. the integrated optical component formed by the curved mirror 73, and the transmitter 1, the receiver 2, and the mirror 74.

In the solution of FIG. 7, as in the solution of FIG. 3, optional accessories can be used. Possible accessories include the pre-optics of the transmitter 1 or the receiver 2, which can include one or more lenses and/or a beam restrictor. As in the solution of FIG. 3, in the solution of FIG. 7 too there is a 'dark' zone 5 designed between the receiver beam 4 and the transmitter beam 3.

Figure 8:
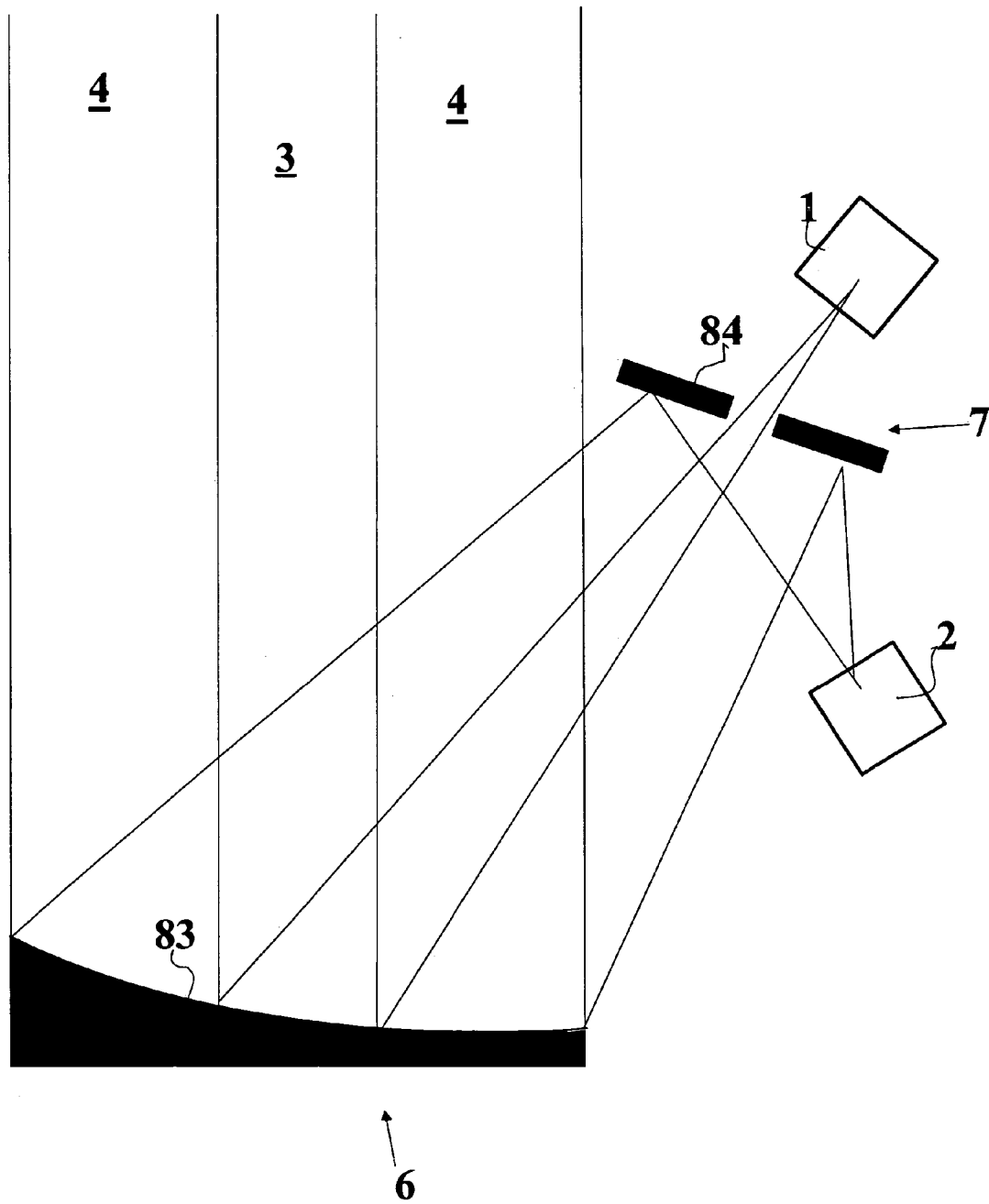
FIG. 8 shows a schematic diagram of a sixth solution according to the invention.

The solution of FIG. 8 includes an integrated optical component 6 and a reflecting element 7, with the aid of which a transmitter beam 3 and a receiver beam 4 are formed. In this solution, the integrated optical component 6 is formed by a single curved mirror 83, which has a focal point outside the parallel beams (the transmitter beam 3 and the receiver beam 4). A mirror 84, in which there is a hole located more or less in the central zone of the beam proceeding towards the focal point, acts in turn as the reflecting element 7. The transmitter 1 is located at the focal point of the curved mirror 83, so that the light obtained from the transmitter 1 travels through the hole in the mirror 84 and is refracted by the central area of the curved mirror 83 to form a transmitter beam 3 of the desired shape.

The mirror 84, on the other hand, is positioned so that the light arriving from the edge areas of the curved mirror 83 is reflected towards the reflected focal point. The receiver 2 is located at this reflected focal point.

In the basic solution of the embodiment of FIG. 8, as in the solution of FIG. 3, there are four optical components that have to be positioned relative to each other, i.e. the integrated optical component formed by the curved mirror 83, and the transmitter 1, the receiver 2, and the mirror 84.

In the solution of FIG. 8, as in the solution of FIG. 3, optional accessories can be used. Possible accessories include, for example, the pre-optics of the transmitter 1 or the receiver 2, which can include one or more lenses and/or a beam restrictor. As in FIG. 3, in the solution of FIG. 8 too a 'dark' zone 5 can be designed between the receiver beam 4 and the transmitter beam 3, even though such a zone is not shown in FIG. 8. The 'dark' zone can, for example, be implemented by restricting the beam sent by the transmitter 1, or by making a non-reflecting area on the surface of the curved mirror 83, between the said central area and the edge area.

Embodiments of the invention, differing from those disclosed above, can also be contemplated. For example, the embodiments disclosed above can be modified so that the locations of the transmitter and the receiver are reversed. In such an embodiment, the transmitter beam surrounds the receiver beam. The embodiments of FIGS. 3, 4, 7, and 8 can also be modified in such a way that a specific curve is designed in the mirrors acting as the reflecting element 7, allowing these mirrors to also participate in refracting light in the optical system of the lidar. The intention, however, is to implement the principal refraction with the aid of the integrated optical component 6.

In connection with the embodiments of the Figures, it has also been stated that the transmitter beam is formed by the central area of the integrated optical component 6. This does not mean, however, that the transmitter beam 3 must be precisely centred, or that it always even covers the central area of the integrated optical component 6. The formation of the transmitter beam 3 can equally well be positioned to take place near the edge of the integrated optical component 6, in which case the receiver beam surrounding the transmitter beam 3 will be considerably wider on one side of the transmitter beam 3. In fact, it is not even necessary for the receiver beam 4 (or, in an inverted embodiment, the transmitter beam 3) to completely surround the transmitter beam 3. From the point of view of the measurement stability, however, it is preferable for the receiver beam 4 to surround the transmitter beam 3, at least more or less completely. Further, it is preferable for the transmitter beam 3 to be located more or less in the central zone of the receiver beam 4 and for the receiver beam 4 and the transmitter beam 3 to be shaped rotationally symmetrically. Nevertheless, the receiver beam 4 and the transmitter beam 3 can also be designed to be asymmetrical, or to be symmetrical in some other way, without, however, deviating from the scope of the invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A lidar, which includes a transmitter (1) and a receiver (2), as well as an optical system, which is arranged to direct at least part of light emitted by the transmitter (1) to form a transmitter beam (3) proceeding towards an object and to define the receiver beam (4) to the receiver (2), at least part of the light arriving from the area of which is focussed on the receiver (2), which optical system is implemented so that the beams (3, 4) immediately in front of the lidar are located substantially outside of each other and one of the beams (3, 4) at least partially surrounds the other beam (4, 3), and wherein the optical system includes an integrated optical component (6), the integrated optical component (6) consisting of one lens (33, 43) and having a first area for the transmitter beam (3) and a second area for forming the receiver beam (4), and wherein said first area of the integrated optical component (6) is adapted to form the transmitter beam (3) such that refraction of the transmitter beam (3) takes place with the aid of said first area of the integrated optical component (6), wherein the optical system comprises a mirror in order to provide a reflection, so that the focal point of the light refracted in the second area of the integrated optical component lies at a distance to a focal point of the light refracted in the first area of the integrated optical component, and wherein the transmitter (1) is located at one of said two focal points and the receiver (2) is located at the other of said two focal points.

2. The lidar according to claim 1, wherein the mirror is provided with a hole, so that the emitted light travels through the hole between the focal point and the first area of the integrated optical component (6), and the received light is reflected to a focal point reflected from the surface of the holed mirror.

3. The lidar according to claim 1, wherein the mirror creates a reflected focal point of the integrated optical component (6), in such a way that the light transmitted from the reflected focal point is reflected to the first area of the integrated optical component (6), the mirror being positioned in such a way that the light received through the second area of the integrated optical component (6) bypasses the mirror and proceeds to the focal point of the integrated optical component (6).

4. The lidar according to claim 1, wherein a field of vision (4) of the receiver is essentially annular and is positioned around the transmitter beam (3).

5. The lidar according to claim 1, wherein the refraction of the transmitter beam (3) and the receiver beam (4) takes place principally with the aid of the integrated optical component (6).

6. The lidar according to claim 1, wherein the said second area of the integrated optical component (6) surrounds the said first area, without intersecting the first area.

7. The lidar according to claim 1, wherein the said second area of the integrated optical component (6) is located in an edge area of the integrated optical component (6) and the said first area is located in a central area of the integrated optical component (6).

8. The lidar according to claim 1, wherein the transmitter beam (3) is located immediately in front of the lidar at a distance from a field of vision (4) of the receiver, thus forming a 'dark' zone (5) between the beams (3, 4).

9. The lidar according to claim 1, wherein the transmitter beam (3) and a field of vision (4) are shaped essentially rotationally symmetrically relative to a common central axis.

10. The lidar according to claim 1, wherein in the measurement zone of the lidar, the transmitter beam (3) is located at least partly within a field of vision (4) of the receiver.

11. The lidar according to claim 1, wherein the transmitter is arranged to produce a nearly monochromatic beam of light, the wavelength of which is in a range 300-5000 mm.

12. The lidar according to claim 11, wherein the transmitter is arranged to produce a nearly monochromatic beam of light, the wavelength of which is in the range 400-2000 mm.

13. The lidar according to claim 1, further comprising at least one restrictor (38) between the receiver (2) and the integrated optical component (6), for restricting the beam of light directed from the optical system to the receiver (2).

14. The lidar according to claim 1, further comprising at least one restrictor (36) between the transmitter (1) and the integrated optical component (6), for restricting the beam of light directed from the transmitter (1) to the optical system.

15. The lidar according to claim 1, wherein the lidar is adapted to make meteorological measurements, including cloud-ceiling and visibility measurements, and to determine a structure or an altitude of atmospheric boundary layers.

* * * * *